March 2, 1937.  S. W. BRIGGS  2,072,393

PRESSURE FILTER

Filed Feb. 5, 1934

Inventor
Southwick W. Briggs

By Mawhinney & Mawhinney
Attorneys

Patented Mar. 2, 1937

2,072,393

UNITED STATES PATENT OFFICE 2,072,393

PRESSURE FILTER

Southwick W. Briggs, Glenmont, Md.

Application February 5, 1934, Serial No. 709,881

2 Claims. (Cl. 210—131)

The present invention relates to filters, particularly of the pressure type, and has for an object to prevent channeling of the filtering material by contraction, settling and the like.

It has been found that a filtering material of granular form if put in a cylindrical or other container will settle slightly and allow the fluid being filtered to pass through the material by channeling, and this settling takes place by gravity, by movement of the material under pressure, by wear on the particles of filtering material, and by liberation and displacement of air, gases and the like from between the filtering particles.

The object of this invention is to maintain the filtering material at all times in a constant and predetermined compact condition.

To accomplish this object the present invention provides means for automatically taking up all settling occurring in the filtering material so that channeling cannot occur and at the same time not interfering with or changing the operation of the filter.

With the foregoing and other objects in view, the invention will be more fully described hereinafter, and will be more particularly pointed out in the claims appended hereto.

Figure 1:
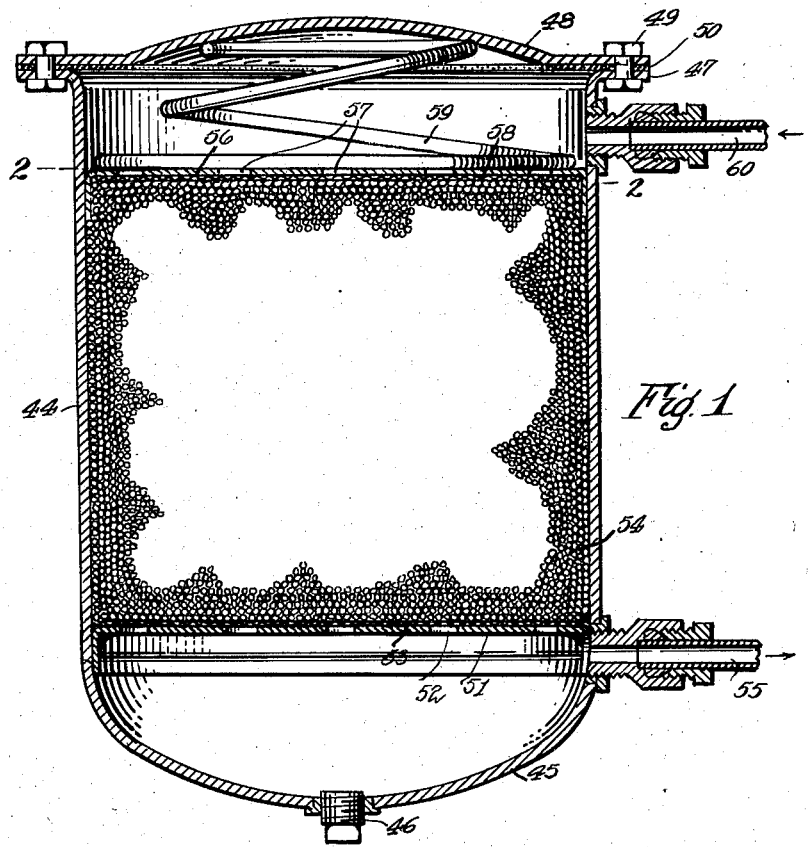

In the drawing, wherein like symbols refer to like or corresponding parts throughout the several views, Figure 1 is a vertical section through a filter embodying the present invention.

Figure 2:
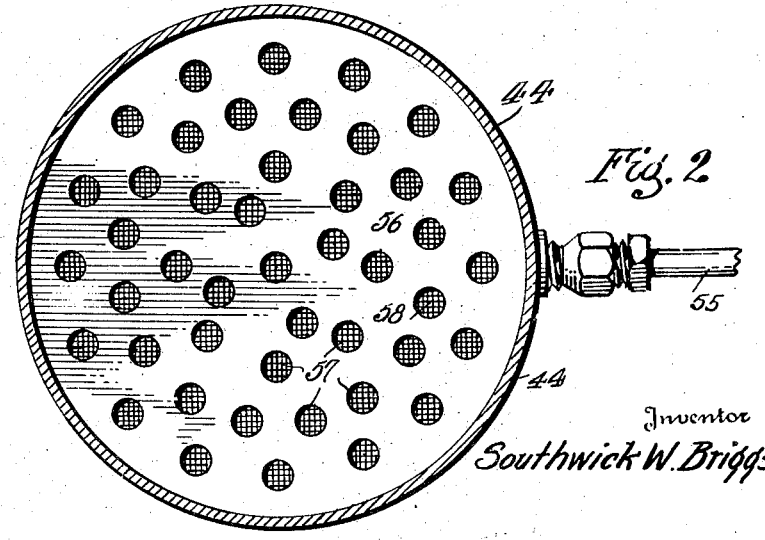

Figure 2 is a transverse section taken through the upper end portion thereof on the line 2—2 of Figure 1.

Referring now to the drawing, there is shown one form of the invention. In this construction the casing 44 has a closed bottom 45 with a drain plug 46 therein and is open at its upper end with an outturned flange 47 providing a support or ledge for a cover 48 which is secured to the flange 47 by clamping bolts 49, or the like, a packing gasket 50 being interposed between the flange 47 and the marginal edge portion of the cover 48. Within the lower end of the casing 44 is disposed a false bottom or disc 51 having perforations 52 therein and which supports on its upper surface a screen 53 of suitable mesh for supporting a filtering material body 54 above the partition 51. The partition 51 is spaced above the bottom 45 of the casing a distance sufficient to provide a compartment or chamber in the bottom of the casing adapted to receive oil forced downwardly through the filtering body 54 and the screen 53, and the casing 44 at one side is provided with an outlet pipe 55 by means of which the filtered oil or other substance being treated is carried off.

In the upper end of the casing 44 is disposed a piston or follower 56 which slidably fits in the casing 44 and is adapted to rest upon the upper end of the filtering material body 54. The piston 56 is provided with a number of perforations or openings 57 and may carry a screen 58 at its under side adapted to lie in contact with the upper surface portion of the filtering material.

Within the space above the piston 56 is disposed an expanding spring 59 or the like which bears at one end upon the piston 56 and at its other end against the cover 48, and the latter may be domed or otherwise suitably constructed for receiving and centering the upper end of the spring 59. The spring 59 may be reduced in diameter at its upper end to seat in the cover 48.

The space between the cover 48 and the piston 56 provides an inlet compartment adapted to receive oil or the like under pressure through an inlet pipe 60 which opens through the side of the casing 44, as shown in Figure 1. The oil under pressure entering the upper end of the casing 44 passes downwardly through the perforations 57 into piston 56 and is forced through the filtering material body 54 and thence outwardly through the pipe 55 at the bottom of the casing. The spring 59 is of predetermined pressure so as to maintain the desired degree of compactness of the filtering material body 54, and any settling of the filtering material is quickly taken up by the advance of the piston 56 thereagainst to prevent channeling and to maintain at all times the desired even pressure on the filtering material.

With a filtering element of this type constantly under a pressure tending to hold the material at a uniform compactness, when there is a relief of pressure in the filter, internal expansion takes place in the filtering element body which frequently effects separation of the filtering particles and channeling through the filter element. When there is a tendency for this action to take place, the pressure element 56 follows up any possible contraction of the filter body so as to maintain the same at all times in a uniform condition of compactness.

What is claimed is:—

1. A filter comprising a substantially cylindrical casing having an intake adjacent one end and an outlet adjacent the other end, a pair of spaced apart perforate partitions in the casing between the intake and outlet and dividing the casing into an intake chamber, an outlet chamber and an intermediate filtering chamber, the partition between the intake and filtering chamber being movable, a removable end wall for said intake chamber provided with a concave offset axial portion, a spring in said intake chamber having one end thereof relatively large and engaging against said movable partition adjacent the marginal edge portion thereof and the other end relatively small and engaging within said concave axial portion, and a granular filtering means within said filtering chamber adapted to remove impurities in the oil passing therethrough.

2. A filter comprising a substantially cylindrical casing, said casing having an inlet opening adjacent one end and an outlet opening adjacent the other end, said one end being open and said other end being closed, a pair of spaced apart perforate partitions within the casing inwardly of each end thereof and dividing the casing into an inlet chamber, an outlet chamber and an intermediate filter chamber, a pair of screens in the filter chamber engaging one against each partition, an annular flange carried by the casing at the open end thereof, a closure plate engaging said flange, means for securing said plate on said flange, said plate having a centrally disposed concavo-convex portion with the concave side thereof innermost, the partition between the intake chamber and the filter chamber being movable, and a spring in said intake chamber having one end thereof relatively large and engaging against said movable plate adjacent the marginal edge portion thereof and the other end relatively small and seated in the concave portion of said closure plate, and a granular filtering means within said filter chamber and adapted to remove impurities in the oil passing therethrough.

SOUTHWICK W. BRIGGS.